Sept. 3, 1968 C. AMBLARD 3,399,657
COMBUSTION ENGINE IGNITION
Filed Jan. 11, 1967 4 Sheets-Sheet 1

INVENTOR:
CLAUDE AMBLARD
by
Browne, Schuyler + Beveridge
Attorneys

Sept. 3, 1968  C. AMBLARD  3,399,657
COMBUSTION ENGINE IGNITION
Filed Jan. 11, 1967  4 Sheets-Sheet 2
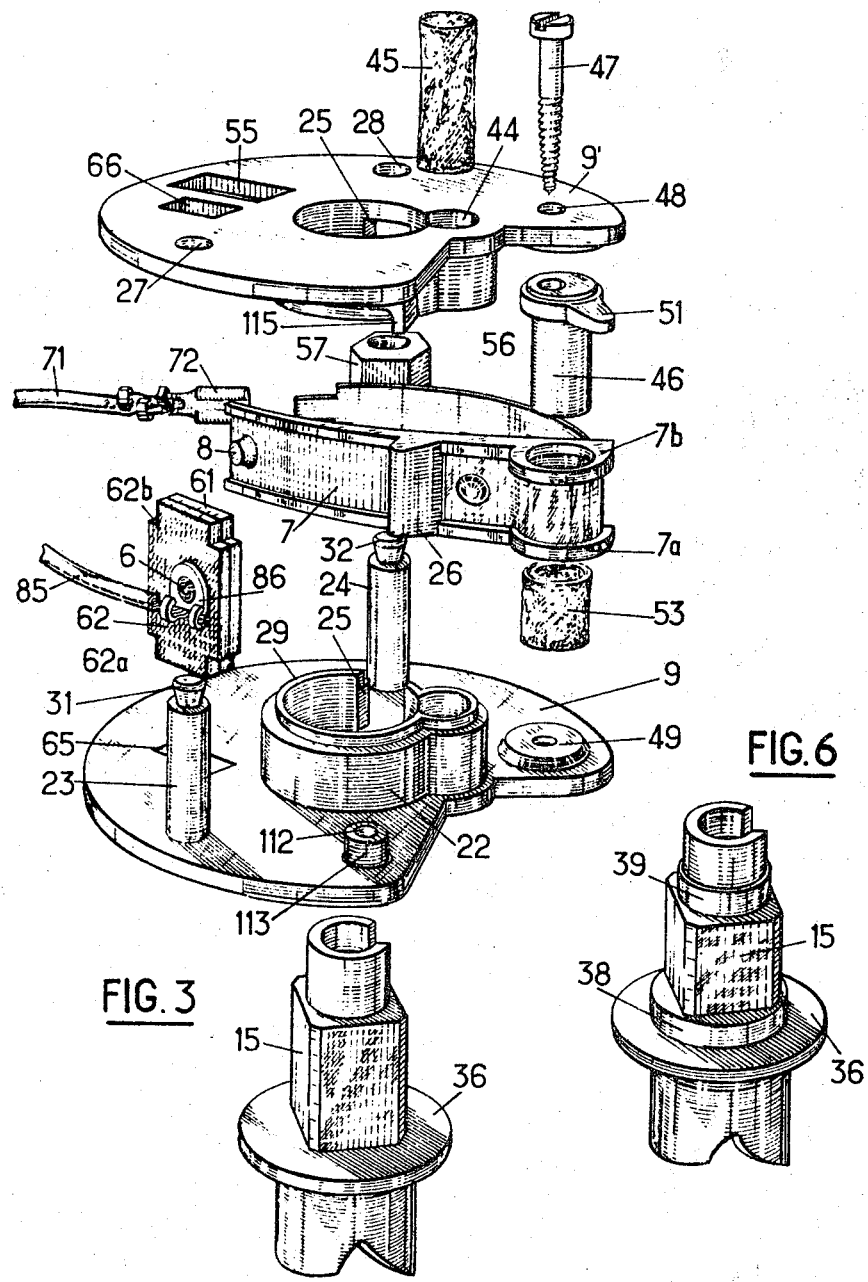
INVENTOR:
CLAUDE AMBLARD
by
Browne, Schuyler & Beveridge
Attorneys Sept. 3, 1968     C. AMBLARD     3,399,657
COMBUSTION ENGINE IGNITION
Filed Jan. 11, 1967     4 Sheets-Sheet 3
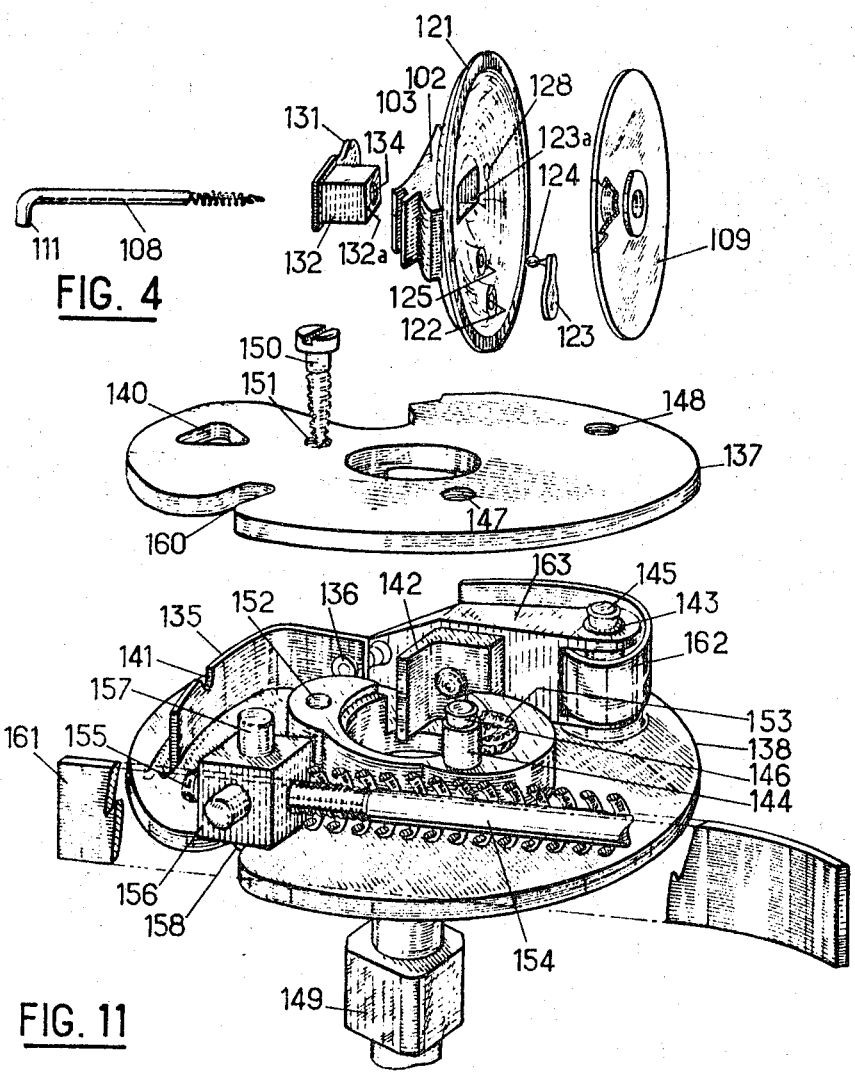
INVENTOR:
CLAUDE AMBLARD
by
Browne, Schuyler & Beveridge
Attorneys Sept. 3, 1968 C. AMBLARD 3,399,657
COMBUSTION ENGINE IGNITION
Filed Jan. 11, 1967 4 Sheets-Sheet 4
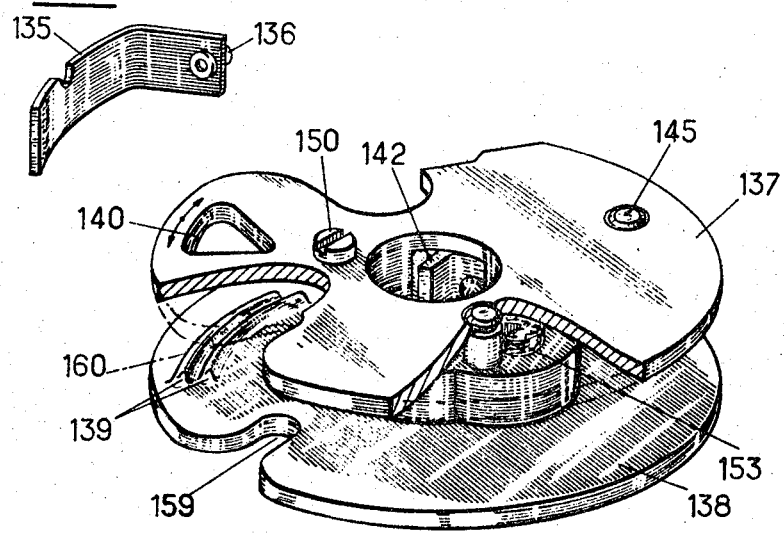
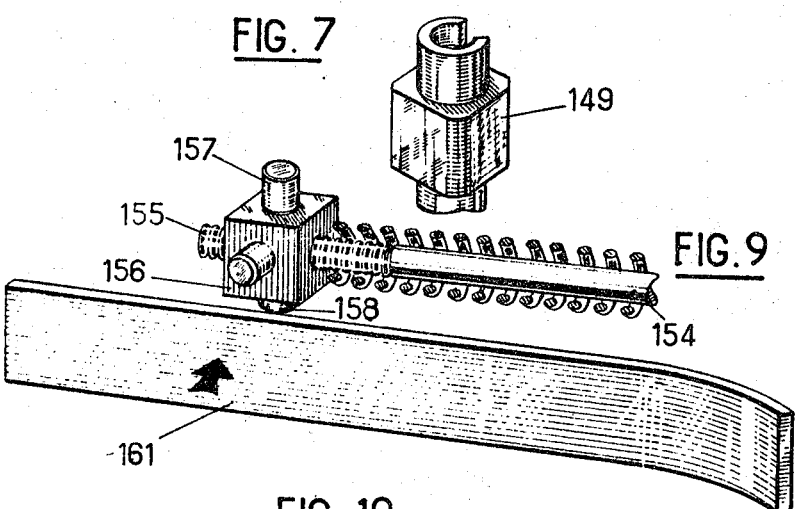
INVENTOR:
CLAUDE AMBLARD
by
Brown, Schuyler + Beveridge
Attorneys

United States Patent Office

3,399,657
Patented Sept. 3, 1968

---

3,399,657
COMBUSTION ENGINE IGNITION
Claude Amblard, Issy-les-Moulineaux, France, assignor to Societe Anonyme pour l'Equipement Electrique des Vehicules S.E.V. Marchal, Issy-les-Moulineaux, France
Filed Jan. 11, 1967, Ser. No. 608,652
Claims priority, application France, Jan. 14, 1966, 45,902; July 28, 1966, 71,282
25 Claims. (Cl. 123—117)

ABSTRACT OF THE DISCLOSURE

A combustion engine ignition device including fixed and movable breaker points supported on a plate for actuation by a cam which extends through an aperture in the plate and in one embodiment has an annular surface supporting the plate. Axially projecting from the aperture in the plate is a hub which receives a cylindrical centering surface on the cam whereby the plate is centered solely by the centering surface on the cam.

---

The invention concerns combustion engines ignitions, i.e. apparatus that comprise among other things a rotary cam actuating a breaker arm or lever, as well as a fixed breaker point, supported by a plate mounted in the housing of the apparatus either fixedly or pivotable concentrically to the said cam and actuated by a system sensitive to the vacuum prevailing in the gas intake manifold of the engine.

Apparatus of this type are relatively expensive both in manufacture and in upkeep, and servicing requires much care in assembling and regulating. Moreover, they are not always as accurate as could be desired, if they are provided with a vacuum spark control system, because the plate bearing the fixed breaker point if cause to turn by a slight angle in the housing of the apparatus so that wear of the guide elements of the plate occurs in circumscribed areas and irregularly.

The object of the invention is to develop an ignition that is more accurate than conventional ignitions, being cheaper at the same time, and much more easily serviced and that can be regulated before installation.

To effect this, according to a principal feature of the invention, the plate that bears the fixed breaker point and on which the arm pivots is centered solely on the rotary cam and rests on an annular element that is integral with the said cam.

Because of this special arrangement, the engine ignition does not run the risk of being disturbed by the looseness or the catching of the plate in the housing, nor by the play of the cam supporting shaft in the housing, as might happen in the case of ordinary ignition devices, because the moment of ignition is determined by the relative positions of the cam and the breaker arm and because, according to the invention, the ignition housing no longer intervenes in the determination of these relative positions, since all the elements involved are borne by the plate centered directly and solely on the cam itself.

The invention also embodies one or more of the following features:

(a) The plate presents a hub whose length is at least equal to the length of the cam.

(b) The cam is provided, at least at one of its ends, with a cylindrical centering portion, and the recess of the plate hub presents one or two corresponding cylindrical bearing surfaces.

(c) A second plate is fixed to the first by crosspieces, and the fixed breaker point as well as the breaker arm are enclosed between the two plates.

(d) Each plate is of insulating material, namely plastic.

(e) The two plates are of molded plastic. Their hubs present recesses for mutual centering and one of them supports rodlike crosspieces terminating in bosses that are force-fitted into corresponding holes in the other plate.

(f) The pivot pin of the breaker arm is mounted on the plate at an eccentric location.

(g) The breaker arm is pivotably mounted on an eccentric pintle that is furnished with a rotor that is threaded onto a bolt fixed to the plate.

(h) The recess of the plate hub presents a longitudinal narrowing lined with a piece of felt impregnated with lubricant, which felt is in contact with the cam.

(i) The recall spring of the breaker arm is applied against a preferably prismatic block, pivotally mounted eccentrically on the plate.

(j) The fixed breaker point is borne by a plate that presents two claws engaged respectively in two corresponding holes of the two plates.

(k) The platelet that is integral with the fixed breaker point is rigid and fixed to a platelet that has a certain flexibility and dimensions slightly larger than those of the said platelet that is integral with the fixed breaker point, so as to be the only element of this unit that is in direct contact with the two plates.

(l) At least the upper plate presents an opening for servicing, perpendicular to the zone of breaker point contact.

(m) A terminal-relay intended to be connected to the spark coil is rigidly fixed to the insulated head of the capacitor, the said terminal being in electric connection via a cable with the breaker arm spring.

(n) The fixed breaker point is grounded by a cable fixed to a quick assembly clip attached to a ground terminal integral with the capacitor collar.

(o) The end of the vacuum control rod for the spark is bent at a right angle and engaged in a hole in the plate.

(p) The second plate presents a boss perpendicular to the hole in which the bent end of the vacuum spark control is seated, to prevent the latter from emerging from the said hole, the said boss presenting a recess at the side that seats the said rod when it is attached to the plate.

(q) The base of the capsule of the vacuum spark control presents, on two opposite faces, two grooves that respectively engage the opposite edges of a rectangular recess in the upper part of the housing.

(r) The capacitor presents two tabs that are applied against the opposite edges of a rectangular opening in the upper part of the housing.

(s) Each attaching spring of the housing cap has at its two ends two elastic tabs that are hooked from below in a recess in the bottom of the housing.

(t) The base of the spark control capsule has on the one hand a first hole communicating with the outside air and furnished with a suction valve, and on the other hand a second hole in communication with the interior of the ignition housing and provided with a discharge valve, while the spark control rod passes through the said base, through a tight diaphragm.

(u) The cam is held axially on the ignition device rotary shaft by a bolt mounted in the upper end of the said shaft and whose head is applied against an edge of the recess of the said cam.

(v) The plate is thrust on its centering cam by a spring applied to the ignition device housing.

(w) The spring mentioned under (v) exerts its force by means of the rod of the vacuum spark control.

The invention will be better understood with reading of the following description and examination of the attached drawings which illustrate as non-limitative examples two embodiments of the improved ignition according to the invention.

In the drawings:

FIG. 3 is an exploded view in perspective of the assembly of FIG. 2.

Figure 1:
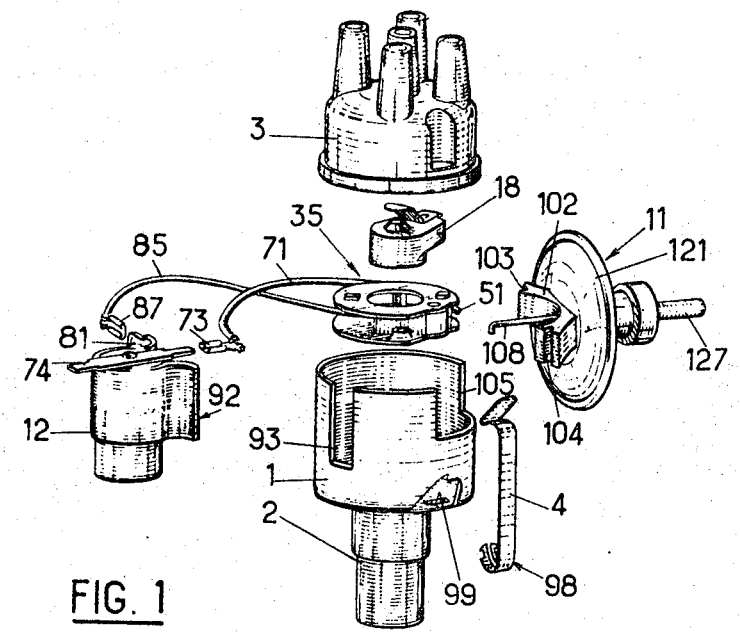
FIG. 1 is an exploded view in perspective of the first ignition device of the invention.
Figure 2:
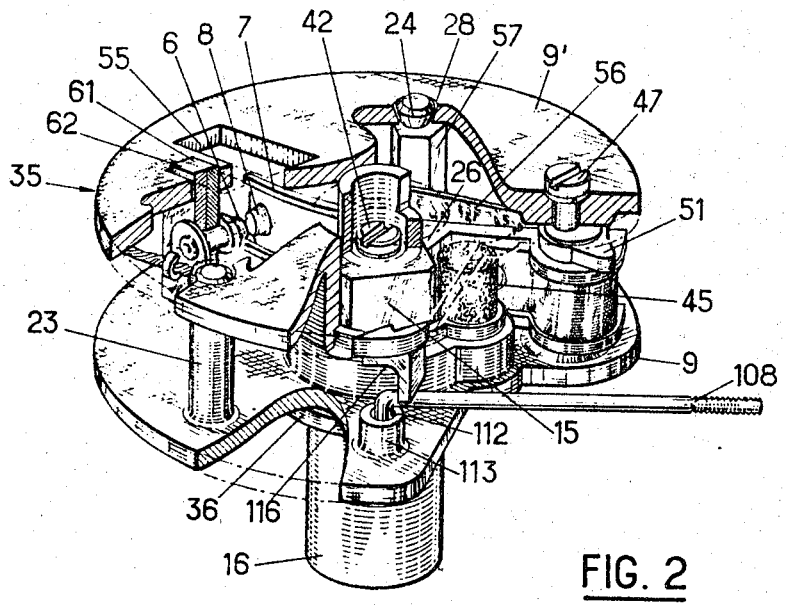
FIG. 2 shows in perspective, cut away, the assembly of the plates supporting the contact breaker.

FIG. 4 also shows an exploded perspective view of the vacuum controlled spark ignition.

FIG. 5 is a partial section along line V—V of FIG. 4.

FIG. 6 shows a modification of the cam.

FIG. 7 is an exploded view of the second form of embodiment of the ignition plate of the invention with its cam and bolt for assembling the cheeks.

FIG. 8 shows the fixed breaker point and the breaker arm corresponding to the embodiment of FIG. 7.

FIG. 9 shows the traction shaft of the correcting pump with its drive.

FIG. 10 shows the spring for neutralizing play.

FIG. 11 shows the plate unit before assembly.

The combustion engine ignition shown in the drawings comprises, in the conventional manner, a housing 1 which is rigidly connected to a sleeve 2 by means of which the device is fixed to the engine, a cap 3 fixed by means of hooks such as 4, a fixed breaker point 6 and a breaker arm 7 for movable breaker point 8 borne by a plate 9, a system 11 for control of the spark as a function of the vacuum prevailing in the gas intake manifold, a capacitor 12, a cam 15 that is pivotable on a shaft 16 rotatably mounted in sleeve 2 and to which it is connected by a system of centrifugal weights (not illustrated) for spark control as a function of the engine r.p.m. On top of cam 15 there is slipped on a distributor rotor 18 that distributes high voltage current to the spark plugs connected by cables respectively to contact studs inside the periphery of cap 3, at the center of which there is a stud connected to the ignition coil and against which there is applied a contact spring of the distributor rotor 18.

The chief novel characteristic of the apparatus resides in the structure and assembly of plate 9 which bears the breaker points. This plate is of molded plastic, for example acetal resin, e.g. that material known commercially as Delrin, and it presents on its upper surface a hub 22 and two rodlike crosspieces 23, 24 which are enclosed respectively in hub 22' of the lower face of a similar plate 9' and in two corresponding holes 27, 28 in said plate; the two hubs 22, 22' of the two plates are mutually centered by an annular groove 29 of hub 22 engaged in a corresponding ridge of hub 22'. The two rodlike crosspieces 23, 24 end in two small bosses 31, 32 which are force-fitted into holes 27, 28 of the other plate 9' and which hold the two plates assembled together under the effect of the intrinsic elasticity of the material of which they are made.

Hubs 22, 22' of plates 9, 9' present a longitudinal slot 25 through which the needle 26 of the breaker arm can pass to come into contact with cam 15.

The unit of plates 9, 9' assembled, designated 35, is slipped onto cam 15 on which it is centered by the recess of the two hubs 22, 22' in contact with the projecting parts of the said cam. The plate unit 35 rests on a flat annular element 36 that is integral with cam 15.

As modification, shown in FIG. 6, cam 15 presents a lower cylindrical bearing surface 38 and an upper cylindrical bearing surface 39 against which the corresponding parts of the recesses of hubs 22, 22' of plates 9, 9' are centered.

Unit 35 of the two plates is thus held perfectly radially by cam 15 on which the said unit is centered, and axially on the one hand by the upper face of flat annular element 36 and on the other hand by the lower face of distributor rotor 18. Furthermore cam 15 is held on the upper end of shaft 16 by a bolt 42 mounted in the upper threaded end of the said shaft, its head being applied against the internal flange of the recess of the upper part of cam 15.

The recess of hubs 22, 22' of the two plates presents a longitudinal constriction 44 in which there is seated a lubricant-impregnated piece of felt 45 which is in contact with cam 15, to ensure permanent greasing of the friction surface of the plate hubs against the said cam.

Breaker arm 7 is pivotably mounted on an eccentrically located pintle 46 which in turn is threaded on a screw 47 that passes through a hole 48 of plate 9' and whose tip is screwed into a hole 49 of the other plate 9. Said screw 47 constitutes at the same time an assembly crosspiece for plates 9, 9'. The eccentrically located pintle 46 has a finger 51 by means of which it can be turned in either direction which allows electrical precise regulation, even during operation, of the separation of the two breaker points and the duration of their contact. A tubular wick 53 impregnated with lubricant encases pintle 46, between the two cheeks 7a, 7b of breaker arm 7.

Upper plate 9' presents a hole 55 perpendicular to the zone of contacts 6 and 8 so that through the said hole it is possible to observe the operation or regulate the gap between the breaker points by means of a calibrated wedge.

Spring 56 of breaker arm 7 is applied against another eccentered socket 57 which in this example is a six-sided prism, slipped onto crosspiece 24. Depending upon the angular position of the said prismatic socket, spring 56 can be tensioned to the degree that is appropriate for the better operation of the apparatus.

Fixed breaker point 6 is integral with a rigid plate 61 which is rigidly connected to a plate 62 of dimensions a little larger than those of the said plate 61, which plate 62 has two claws 62a, 62b, engaged respectively in two holes 65, 66 in plates 9, 9'. The presence of the said plate 62 which is flexible and elastic, tends to reduce the bouncing of the breaker arm on the fixed breaker point 6.

Spring 56 of the breaker arm is connected via a flexible electric cable 71, which has at its two ends quick assembly clips 72, 73, to a terminal relay 74. Moving breaker point 8 can thus be connected to the primary winding of the spark coil by spring 56, clip 72, cable 71, clip 73, terminal relay 74 and a cable connecting said terminal to the coil.

The grounding of fixed breaker point 6 borne by the two insulating plates 9, 9' is effected by means of an electric cable 85, one end of which is fixed to a clip 86 riveted onto fixed point 6, and the other end of which is integral with a quick assembly clip 87 onto a terminal 81 in elastic clip 92 of capacitor 12 and consequently in contact with the edges of recess 93 of metallic housing 1 of the apparatus which is grounded through the engine.

It has been seen above that unit 35 of the two plates 9, 9' encloses fixed breaker point 6 and the breaker moving point 8, the whole being mounted an possibly preliminarily set, the said unit and capacitor 12 ensuring the grounding of the fixed breaker point.

Capacitor 12 is provided with an elastic clip 92 whose two arms are elastically applied against the edges of rectangular recess 93 of housing 1.

The hooks such as 4 for fixation of cap 3 on housing 1 of the apparatus are mounted very simply by their lower curved and longitudinally slit ends to form an elastic pincer 98 with two arms forming hooks engaged in slot 99 in the bottom housing 1, near the edge of the latter. Pincer 98 is engaged in this opening and spring 4 remains in place.

Base 102 of vacuum device 11 for automatic spark control has two constrictions 103, 104 which are engaged respectively on the opposite edges of a wide rectangular recess 105 in housing 1 of the apparatus.

The connection of rod 108 which is integral with the central part of diaphragm 109 of vacuum system 11 is effected simply by the fact that its free end is curved as shown at 111 and passed into an axially directed hole 112 in a protuberance 113 on lower plate 9.

A protuberance 115 on the other plate 9' is opposite the upper end of protuberance 113 at a distance therefrom that is substantially equal to the thickness of rod 108 so that once in place, the curved end of the said rod cannot emerge again from hole 112. Given however that the two disks 9, 9' were assembled in advance, the curved end 111 of rod 108 must be set in place, and for this protuberance 115 presents a recess 116 at the side, in that part that is beyond the curved end 111 of the rod. For assembly it is thus sufficient to present the curved end 111 of the rod in the said recess 116, to pass it into hole 112, then to pivot rod 108, to bring it below the end of protuberance 115.

In order to eliminate the ozone that forms inside the distributor cap, the motion of diaphragm 109 of the spark vacuum control system is utilized continuously to drive air into the ignition device. For this purpose, casing 121 of the system has a hole 122 communicating with the outside air and a suction valve 123 constituted by a small tongue of flexible plastic and elastic material that presents a stub 124 molded integrally therewith and forced into another hole 125 on casing 121. Diaphragm 123 forms a valve applied against the internal face of hole 122 and thus allows outside air to penetrate into casing 121, i.e. from the side of diaphragm 109 that is not exposed to the vacuum from the engine transmitted by pipe 127.

The unit comprising base 102 and casing 121 presents a passage 128 which has a discharge valve 131 at its end that opens into the interior of housing 1 of the ignition device, allowing air thrust by diaphragm 109 to penetrate into the ignition cap. In the example, valve 131 comprises a diaphragm of flexible elastic plastic material molded in the form of housing 132 seated inside passage 123a in which passes control rod 108. The end 132a of the said housing presents a hole 134 in which the rod passes with a tight seal. Hole 134 is made in the bottom of housing 132 and not directly in the plane of diaphragm 131, so as to be as near as possible to diaphragm 109, because the bent end 111 of rod 108 moves with a circular motion inside the ignition apparatus.

Each time that diaphragm 109 moves, it sucks outside air through hole 122, lifting valve 123 and driving the air through passage 128, raising valve 131 inside the ignition cap where excess pressure thus enclosed evacuates ozone-charged air through the various escape vents that are afforded in recesses 93 and 105 of housing 1.

Assembling is accomplished without the use of any tool, without the setting of any screws, elastic pieces or similar small elements that are cumbersome to handle and easy to lose. Assembly is begun by engaging curved end 111 of rod 108 in hold 112 of plate 9. Unit 35 is slipped onto cam 15 at the same time that base 102 is engaged in recess 105 of housing 1. Then the capacitor is connected to the two wires 71 and 85 and the elastic claws 92 of the capacitor are introduced into recess 93 of housing 1. Cap 3, held by two springs 4, holds the whole in place.

To summarize, the system of fixed point 6 and moving point 8 is thus borne by unit 35 of the two plates 9, 9' which is centered on the cam, ensuring a great precision in the functioning of the apparatus, independently of any play that may exist between the shaft and the housing. The unit of the two plates enclosing the breaker points can be replaced almost in an instant without the use of any tool and without manipulation of small fragile easily lost parts by a person not specialized in the work, since the whole assembly can be adjusted in advance. The other elements such as the capacitor, the automatic vacuum spark control and the hooks are also immediately assembled and disassembled. Finally, the auxiliary pump system permanently cleans the air inside the ignition device.

A second embodiment of the invention will now be described. This embodiment is shown in FIGS. 7 to 11.

Platelet 135 which bears breaker point 136 at its extremity is enclosed between protuberances 139 borne by lower cheek 138 and upper cheek 137. Platelet 135 is accessible to a screw driver through hole 140 that opens into recess 141 so that the platelet can be moved in either direction to adjust the points. Breaker arm 163 with needle 142 that comes into contact with cam 149 is mounted on a rodlike crosspiece 143 which is integral with the lower cheek. Crosspieces 143 and 144 end in small protuberances 145 and 146 which are force-fitted into holes 147 and 148 of the upper cheek. Assembly of the plate is effected in this way: a screw 150 passes through hole 151 and is screwed into protuberance 152, completing the assembly and ensuring immobilization of platelet 135 supporting the fixed breaker point.

The traction shaft 154 of the correcting pump has a threading 155 at its end, on which there is screwed a piece 156 which has the form of a square nut, perpendicularly supporting a small cylinder in the middle of each lateral face.

Cylinder 157 is applied to the V notch 160 of the upper cheek, and cylinder 158 is applied to V notch 159. When shaft 154 is moved by the pump, element 156 thus causes the rotation of the plate. Spring 161 which is rigidly connected to the housing, is applied on element 156, positioning the respective cylinders correctly and without play in the V notches of the checks.

Since the pressure of spring 162 of the moving breaker point is greater than that of spring 161, the centering hole of the plate is pressed by the spring into contact with cam 149.

Because of this special arrangement, the good operation of the ignition device runs no risk of being disturbed by play or catching of the plate in the housing, nor by play of the cam on its shaft and of the said shaft in the housing, since the moment of ignition is determined by the relative positions of the cam and the breaker arm.

In the present invention, the ignition device housing does not any longer intervene in determination of these positions. All the elements in question are borne by the plate that is centered solely on the protuberances of the cam. The unit of the two cheeks enclosing the points can be replaced very rapidly without use of a tool, and the unit can be preadjusted.

Of course the invention is not limited to the embodiments described and shown, which are only presented by way of example. Modifications can be applied to them without exceeding the scope of the invention.

I claim:

1. In a combustion engine ignition device including a housing, a cam supported for rotation in the housing, fixed and movable breaker points, and spring means for actuating the movable breaker point in one direction with said cam actuating the movable breaker point in the opposite direction; a cylindrical centering surface on the periphery of said cam, a plate having a central aperture receiving said centering surface such that the plate is solely centered by the centering surface on said cam, means supporting said plate in a direction axially of the cam, said fixed and movable breaker points being supported on said plate.

2. The combination defined in claim 1 wherein said plate has a central hub around its central aperture receiving and being centered by said centering surface on said cam, said hub having a length at least equal to the length of said cam.

3. The combination defined in claim 1 further including a second plate overlying and generally coexistensive with said first plate, and cross pieces extending between said first and second plates and fixing the same with respect to each other, said fixed and movable breaker points being enclosed between said first and second plates.

4. The combination defined in claim 3 wherein said first and second plates are both made of plastic insulating material.

5. The combination defined in claim 3 wherein said second plate has a central aperture and a hub around the aperture, said hubs of said first and second plates having cooperable groove means in their extremities for aligning them together in coaxial interrelationship, and wherein said cross pieces are fixed to one of said first and second plates and are force fitted into holes in the other of said first and second plates.

6. The combination defined in claim 1 further including a moveable breaker arm supporting said moveable breaker point for movement on said plate, and means for pivotally mounting said moveable breaker arm on said plate including an eccentrically located pivot means.

7. The combination defined in claim 6 further including an adjusting screw fixed to said plate, and an adjusting control finger mounted on said pivot means and threaded onto said adjusting screw.

8. The combination defined in claim 2 wherein the said hub includes a generally axially extending constricted passage portion lined with a piece of felt impregnated lubricant in contact with said cam.

9. The combination defined in claim 1 further including a spring abutment member pivotally and eccentrically mounted on said plates, and wherein said spring has one end applied against said abutment member.

10. The combination defined in claim 3 further including a small platelike member having its opposite ends engaged in corresponding apertures in said two plates, said small platelike member having fixed thereto said fixed breaker point.

11. The combination defined in claim 10 wherein said fixed breaker point is attached to a second small platelike member having a dimension in the direction axially with respect to the axis of the plates less than the corresponding dimension of said first small platelike member so as not to contact said plates, and wherein said first platelike member is made of flexible material, said first and second platelike members being connected to each other.

12. The combination defined in claim 3 wherein one of said plates has an opening therethrough for inspection in a direction generally perpendicular to the plane of the plates, said inspection opening being positioned above the zone of contact of said breaker points.

13. The combination defined in claim 1 further including an ignition capacitor having an insulated cap, a terminal relay connectable to an ignition coil and being rigidly connected to the insulated cap, said terminal relay being electrically connected to said spring.

14. The combination defined in claim 13 further including a ground terminal integral with the collar of the ignition capacitor, and wherein said fixed breaker point is electrically grounded to the ground terminal.

15. The combination defined in claim 1 further including a vacuum control means including a rod having an angularly projecting extremity, an opening in said plate receiving the extremity of said rod.

16. The combination defined in claim 3 further including a vacuum control means including a rod having an angularly projecting extremity, an opening in said first plate receiving the extremity of said rod, said second plate having a protuberance above the rod receiving opening and being engageable with the rod to maintain the same in said opening.

17. The combination defined in claim 15 wherein said housing has a recess defined in part by a pair of axially extending and circumferentially spaced edges, and wherein said vacuum control includes support means including oppositely directed members having recesses formed therein engaged on said edges in said housing.

18. The combination defined in claim 13 further including a recess in the housing, and a spring clip engaged about said capacitor and received in said recess in the housing to mount the capacitor in the housing.

19. The combination defined in claim 1 further including a housing cap received over said housing, first and second recesses in said cap and in said housing respectively, and a spring clip having opposite elastic hook ends received in said recesses to secure the cap on the housing.

20. The combination defined in claim 1 further including a vacuum control means including a diaphragm adapted to be responsive to vacuum prevailing in the gas intake manifold of an internal combustion engine, an operating rod connected to the diaphragm at one end and being operatively connected to said plate at the other end, a base plate, valve means in the base plate for connecting the space in the chamber between the diaphragm and the base plate with atmosphere, and second valve means for interconnecting said space with the interior of said housing, said rod passing through said base.

21. The combination defined in claim 20 wherein said first and second valve means are check valves having moveable flap members located on opposite sides of said base.

22. The combination defined in claim 1 further including a rotary shaft rotatably mounted in said housing, said cam being mounted on said rotary shaft, and a fastener means secured to the upper end of said cam and into said rotary shaft for securing the cam to the rotary shaft.

23. The combination defined in claim 1 further including a spring means acting against said housing in a direction laterally thereof for thrusting said plate on said cam.

24. The combination defined in claim 23 further including a vacuum control means having a rod, said plate having a peripheral recess, means operatively connecting said rod to the plate including an abutment element having a portion projecting through said recess, said spring means acting on said housing to urge said rod and abutment means radially inwardly in said recess.

25. In an engine ignition device including fixed and movable breaker points, and means including a cam for actuating the movable breaker points into and out of engagement with said fixed breaker point; a plate supporting said fixed and movable breaker points, said plate having a central aperture and a hub projecting axially from the central aperture, said cam being rotatably received in said hub and having a radially projecting surface below said plate, said surface supporting said plate in a direction axially of the cam, said cam having a cylindrical centering surface received in said hub such that the plate is solely centered by means of said centering surface.

References Cited
UNITED STATES PATENTS

| | | | |
|---|---|---|---|
| 1,905,054 | 4/1933 | Prescott | 123—117 |
| 2,766,336 | 10/1956 | Zocchi | 200—30 X |
| 2,978,551 | 4/1961 | Kinoshita | 123—146.5 X |

RALPH D. BLAKESLEE, *Primary Examiner.*